United States Patent
Lin

(10) Patent No.: US 7,677,269 B2
(45) Date of Patent: Mar. 16, 2010

(54) GRAVITY-CONTROLLED CONSTANT-PRESSURE AND PRESSURE-REGULATION DEVICE

(76) Inventor: Ming-Hung Lin, 3F, No. 2, Lane 429, Fu-Chin Street, Taipei City (TW)

( * ) Notice: Subject to any disclaimer, the term of this patent is extended or adjusted under 35 U.S.C. 154(b) by 568 days.

(21) Appl. No.: 11/706,425

(22) Filed: Feb. 15, 2007

(65) Prior Publication Data

US 2008/0196699 A1 Aug. 21, 2008

(51) Int. Cl.
*F16L 55/04* (2006.01)
(52) U.S. Cl. .............................. 138/31; 138/30; 138/26
(58) Field of Classification Search ................... 138/31, 138/30, 26
See application file for complete search history.

(56) References Cited

U.S. PATENT DOCUMENTS

| | | | | |
|---|---|---|---|---|
| 121,482 | A * | 12/1871 | Baldwin | 138/31 |
| 3,015,345 | A * | 1/1962 | Michael | 138/31 |
| 3,581,774 | A * | 6/1971 | Oeland et al. | 138/31 |
| 4,166,655 | A * | 9/1979 | Spero | 303/87 |
| 4,479,377 | A * | 10/1984 | Jackson et al. | 73/1.19 |
| 4,561,568 | A * | 12/1985 | Hoffmeister et al. | 222/130 |
| 4,714,094 | A * | 12/1987 | Tovagliaro | 138/31 |
| 4,738,339 | A * | 4/1988 | Taylor | 188/322.19 |
| 5,219,000 | A * | 6/1993 | Chalasani et al. | 138/31 |
| 5,664,848 | A * | 9/1997 | Muraski | 303/87 |
| 7,511,386 | B2 * | 3/2009 | Lin | 290/53 |
| 2005/0194054 | A1* | 9/2005 | Moskalik et al. | 138/31 |

* cited by examiner

*Primary Examiner*—Patrick F Brinson
(74) *Attorney, Agent, or Firm*—Apex Juris, pllc; Tracy M Heims

(57) ABSTRACT

A gravity-controlled constant-pressure and pressure-regulation device includes a canister, a weight block, and a seal head. The canister includes a metal layer, an epoxy resin layer, and a plastic sheet layer. The metal layer serves as an inner lining. The epoxy resin layer surrounds an outer circumference of the metal layer. The plastic sheet layer surrounds an outer circumference of the epoxy resin layer. The weight block is movably received in the canister. The metal layer has an inner surface movably and receivingly engages the seal head. The weight block is mounted to the seal head. The weight block is movable upward and downward inside the canister by being acted upon by a gravity force of weight thereof and a lifting force induced by an internal pressure inside the canister to effect mass storage of air inside the canister and stable supply air at constant pressure.

8 Claims, 5 Drawing Sheets

GRAVITY-CONTROLLED CONSTANT-PRESSURE AND PRESSURE-REGULATION DEVICE

FIELD OF THE INVENTION

The present invention relates to a gravity-controlled constant-pressure and pressure-regulation device, and in particular to a device that is capable of mass storage of air and stable supply of constant-pressure air flow, which is particularly suitable for facility requiring constant pressure and stably storing air in a pressure regulated manner.

BACKGROUND OF THE INVENTION

Air accumulation canisters that are currently available in the market are often constructed by a hollow cylindrical canister having opposite ends to which end caps are mounted and sealed by welding. The conventional air accumulation is realized by continuously pumping air into the air accumulation canister through an air compressor. When the amount of air pumped into the canister is increased, the air density inside the canister is also increased. Due to a fixed volume that is provided by the conventional canister, the increasing of the air density causes an increase of the internal pressure of the canister. Due to limited strength of the structure of the canister, the internal pressure cannot exceed an upper limit and thus the amount of air that can be stored inside the canister is limited. When the air is released from the canister, with the amount of the air inside the canister decreased, the internal pressure is also reduced. Thus, the air supplied from the canister is at released at a varying pressure and the pressure is of the low extreme when the canister is going to run out of air.

In tidal power generation facility, an air accumulation canister is used to store pressurized air and to stably discharge airflow of substantially constant pressure for driving a turbine that in turn drives a generator to generate power. The conventional air accumulation canister, however, is not satisfactory in both mass storage of air and stable supply of air at constant pressure. Thus, the present invention is aimed to provide a device for effective mass storage of air and stable supply of constant pressure air flow to suit at least the need mentioned above.

SUMMARY OF THE INVENTION

An objective of the present invention is to provide a gravity-controlled constant-pressure and pressure-regulation device that is effective in mass storage of air and stable supply of constant pressure air by providing a canister inside which a weight block is movable by force balance between gravity thereof and internal air pressure of the canister to effect mass storage of air and stable supply of constant pressure airflow.

Another objective of the present invention is to provide a gravity-controlled constant-pressure and pressure-regulation device that comprises a weight block to provide a determined gravity by adjusting the weight block's weight, and that is used to maintain constant internal pressure inside a canister to effect stable supply of constant pressure airflow.

To realize the above objectives, in accordance with the present invention, a gravity-controlled constant-pressure and pressure-regulation device is provided, comprising a canister, a weight block, and a seal head. The canister comprises a metal layer, an epoxy resin layer, and a plastic sheet layer. The metal layer serves as an inner lining and is provided with reinforcing frames. The epoxy resin layer surrounds an outer circumference of the metal layer. The plastic sheet layer surrounds an outer circumference of the epoxy resin layer. The weight block is movably received in the canister. The canister forms an air inlet and an air outlet. The metal layer has an inner surface movably and receivingly engages the seal head. The weight block is mounted to the seal head. The seal head is provided with sealing rings to seal between the seal head and the inner surface of the metal layer to prevent air leakage. The weight block is movable upward and downward inside the canister by being acted upon by a gravity force of weight thereof and a lifting force induced by an internal pressure inside the canister to effect mass storage of air inside the canister and stable supply air at constant pressure.

BRIEF DESCRIPTION OF THE DRAWINGS

The present invention will be apparent to those skilled in the art by reading the following description of preferred embodiments thereof with reference to the drawings, in which.

DETAILED DESCRIPTION OF THE PREFERRED EMBODIMENTS

Figure 1:
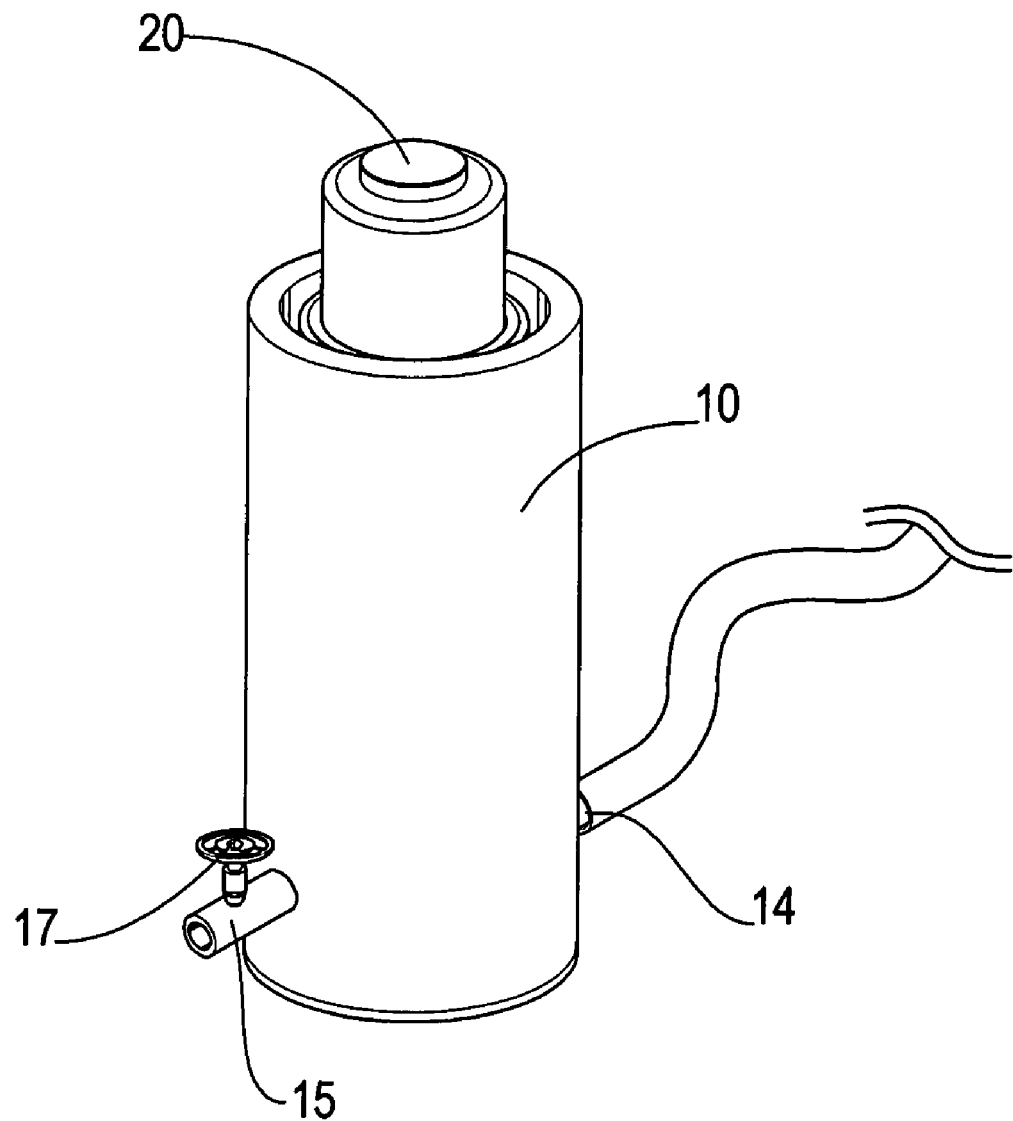
FIG. 1 is a perspective view of a gravity-controlled constant-pressure and pressure-regulation device constructed in accordance with the present invention.
Figure 2:
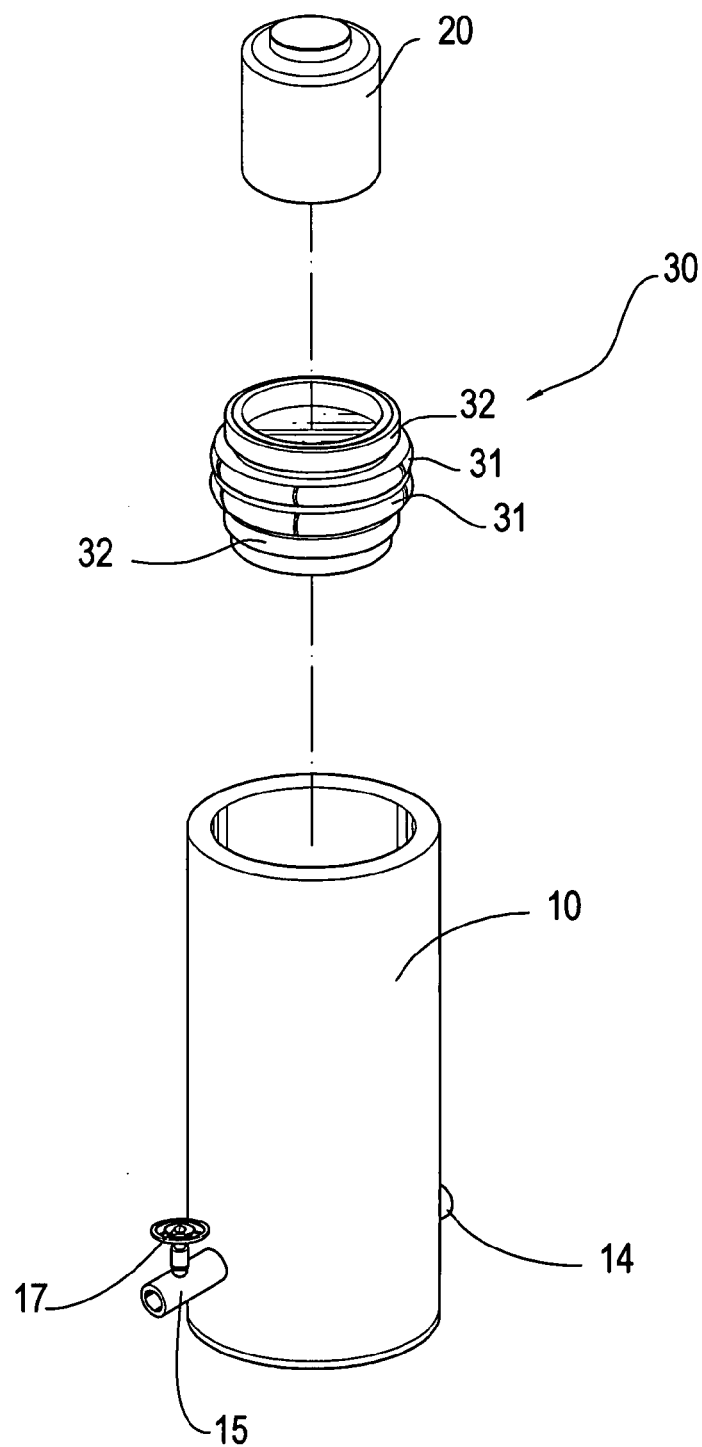
FIG. 2 is an exploded view of the gravity-controlled constant-pressure and pressure-regulation device in accordance with the present invention.
Figure 3:
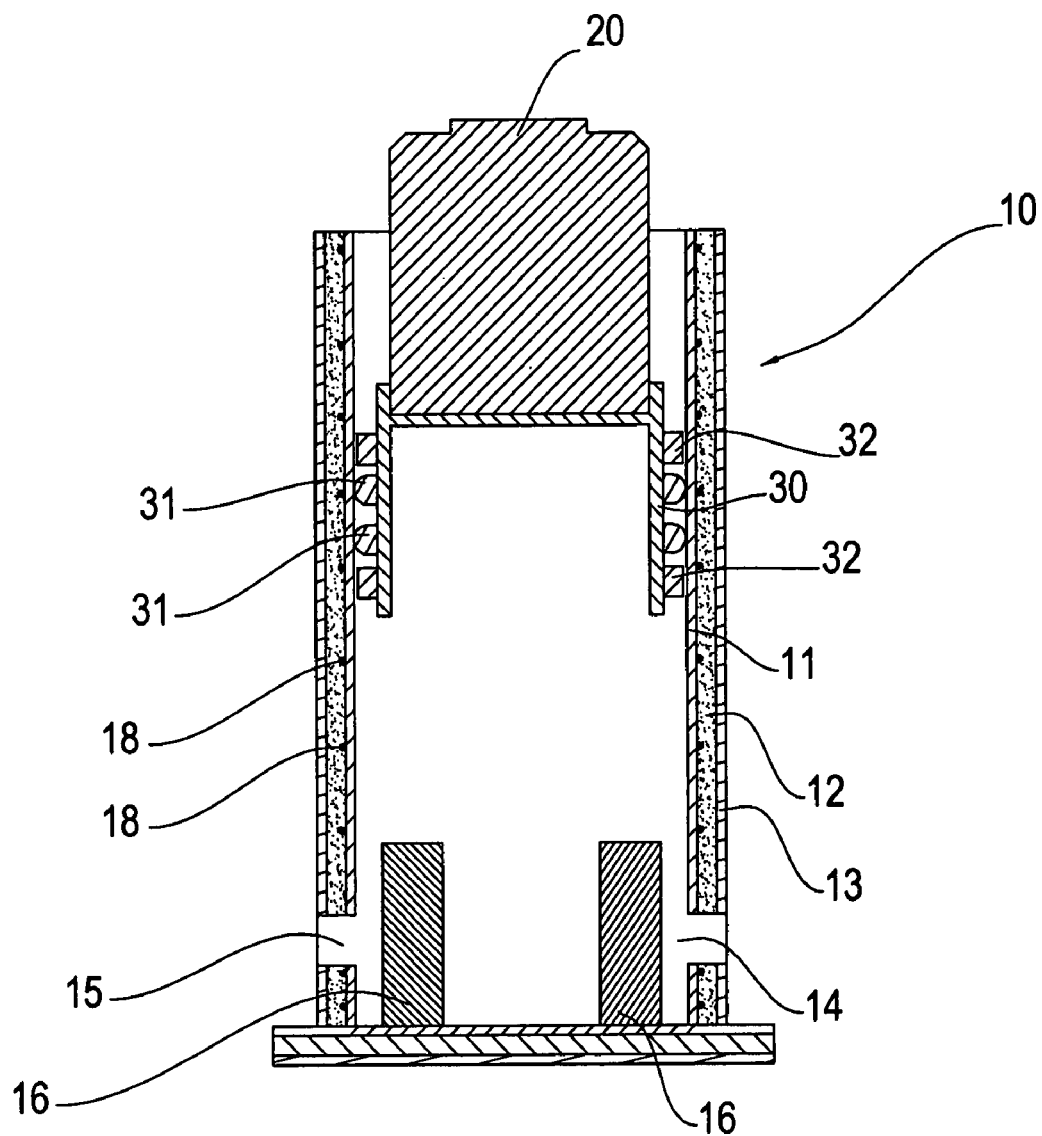
FIG. 3 is a cross-sectional view of the gravity-controlled constant-pressure and pressure-regulation device in accordance with the present invention.

With reference to the drawings and in particular to FIGS. 1-3, a gravity-controlled constant-pressure and pressure-regulation device constructed in accordance with the present invention comprises a canister 10, a weight block 20, and a seal head 30. The canister 10 has an air outlet 15 and an air inlet 14. The canister 10 also comprises support blocks 16 that are mounted on and extend from a bottom of the canister 10 to a height that is higher than the locations of the air inlet 14 and air outlet 15. The air outlet 15 is provided with a flow control switch 17 for regulating air flowrate through the air outlet 15.

The canister 10 is constructed with a metal layer 11, an epoxy resin layer 12, and a plastic sheet layer 13. The metal layer 11 is an inner lining, which is metal plate that is smooth, resistant against abrasion, and resistant against corrosion caused by sea water. In the embodiment illustrated, the metal plate of the layer 11 is made of stainless steel, but can be made of other metallic materials. An outer circumference of the metal layer 11 is surrounded by the epoxy resin layer 12 and is provided with reinforcing frames 18 to maintain the shape of the metal layer 11 and the canister 10. An outer circumference of the epoxy resin layer 12 is surrounded by the plastic sheet layer 13, which in the embodiment illustrated comprises a thin sheet of polycarbonate (PC). By adding the reinforcing frames 18 outside the outer circumference of the metal layer 11 and by filling the epoxy resin between the metal layer 11 and the plastic sheet layer 13 to form a sandwich structure, requirements of being light-weight, pressure-resistant, abrasion-resistant, and of low friction coefficient can be met.

An inner surface of the metal layer 11 movably and receivingly engages the seal head 30. The weight block 20, which can be a metal block, is mounted on the seal head 30. The canister 10 is maintained stationary, while the seal head 30 and the weight block 20 are movable up and down with the increase and decrease of the amount of air stored inside the canister 10. The seal head 30 is made of aluminum casting and is provided with sealing rings 31 to eliminate air leakage. The seal head 30 is further provided with abrasion-resistant guide projections 32 on upper and lower sides of the sealing rings 31 to guide stable up-and-down movement of the weight block 20 and the seal head 30 inside the canister 10. With such an arrangement, the weight block 20 and the seal head 30 is movable upward/downward inside the canister 10 by being acted upon by the their own weight (gravity) and a lifting force induced by the pressure of the air inside the canister 10 to thereby form a gravity-controlled constant-pressure and pressure-regulation device that discharges stable and constant air flow.

The gravity-controlled constant-pressure and pressure-regulation device is operated in such a way that air is supplied into and stored in the canister 10 via the air inlet 14. In case that there is no air stored in the canister 10, the seal head 30 and the weight block 20 rest on and are supported by the support blocks 16. When air is then filled into the canister 10, due to the gravity of the seal head 30 and the weight block 20, initially, the volume of the air inside the canister 10 is maintained fixed by the seal head 30 and the weight block 20, and consequently, the density of the air inside the canister 10 and the internal pressure of the canister 10 are both increased gradually with the filling of the air into the canister 10. When the internal pressure reaches a predetermined threshold, corresponding to a lifting force equivalent to the gravity of the weight block 20 and the seal head 30, the internal pressure becomes fixed and further filling of air causes the seal head 30 and the weight block 20 to move upward. Thus, air can be continuously filled into the canister 10 without causing further increase of the internal pressure for the volume inside the canister 10 is increased instead by the movement of the weight block 20 and the seal head 30.

To release the air inside the canister 10, the air inside the canister 10 is allowed to flow through the air outlet 15, by opening the flow control switch 17. At the beginning of an air release cycle, the volume inside the canister 10 is gradually reduced with the amount of air released, but the internal pressure is maintained fixed, due to the downward movement of the weight block 20 and the seal head 30 by the gravity thereof, until the seal head 30 reaches the support blocks 16. Thus, the internal pressure is kept fixed and the canister 10 can continuously supply, in a pressure regulated manner, air at a constant pressure, which is determined by the gravity of the weight block 20 and the seal head 30, no matter how much air remains inside the canister 10. Conclusively, the gravity-controlled constant-pressure and pressure-regulation device of the present invention features mass storage of air and continuous supply of pressure-regulated air at a constant and preset pressure.

Figure 4:
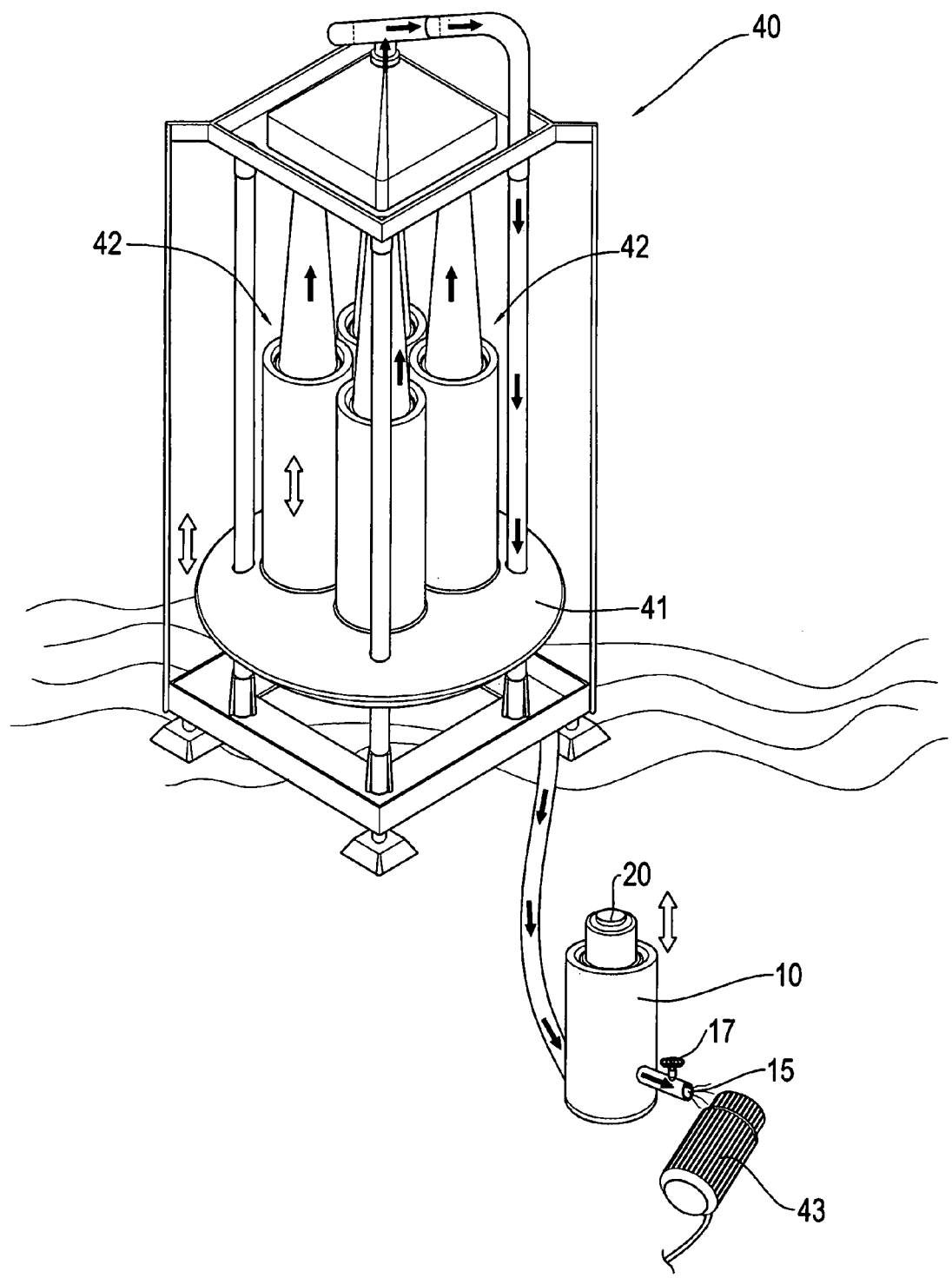
FIG. 4 is a perspective view of a tidal power generation device to which the gravity-controlled constant-pressure and pressure-regulation device of the present invention is applied.

With reference to FIG. 4, which illustrates an application of the gravity-controlled constant-pressure and pressure-regulation device that is coupled to an air pumping mechanism 40 to form a tidal power generation system, which continuously generates and stably supplies pressurized air to extract the kinematic energy of the year-long rushing sea waves and tides and convert the kinematic energy into energy of other forms, such as electrical energy, the tidal power generation system comprises an air pumping mechanism 40 that has a buoy 41, which when moved upward and downward with waves and tides, drives air pumping cylinder 42 to generate pressurized air. The pressurized air is guided into and stored in the canister 10 of the gravity-controlled constant-pressure and pressure-regulation device of the present invention. With the arrangement of the weight block 20 that is movable within and along the canister 10 and the flow control switch 17, pressure-regulated air flow can be selectively released through the air outlet 15 at the constant pressure and the pressure-regulated and fixed-pressure airflow is supplied to an air-driving turbine and in turn driving a power generator 43 for generation of electrical power.

Figure 5:
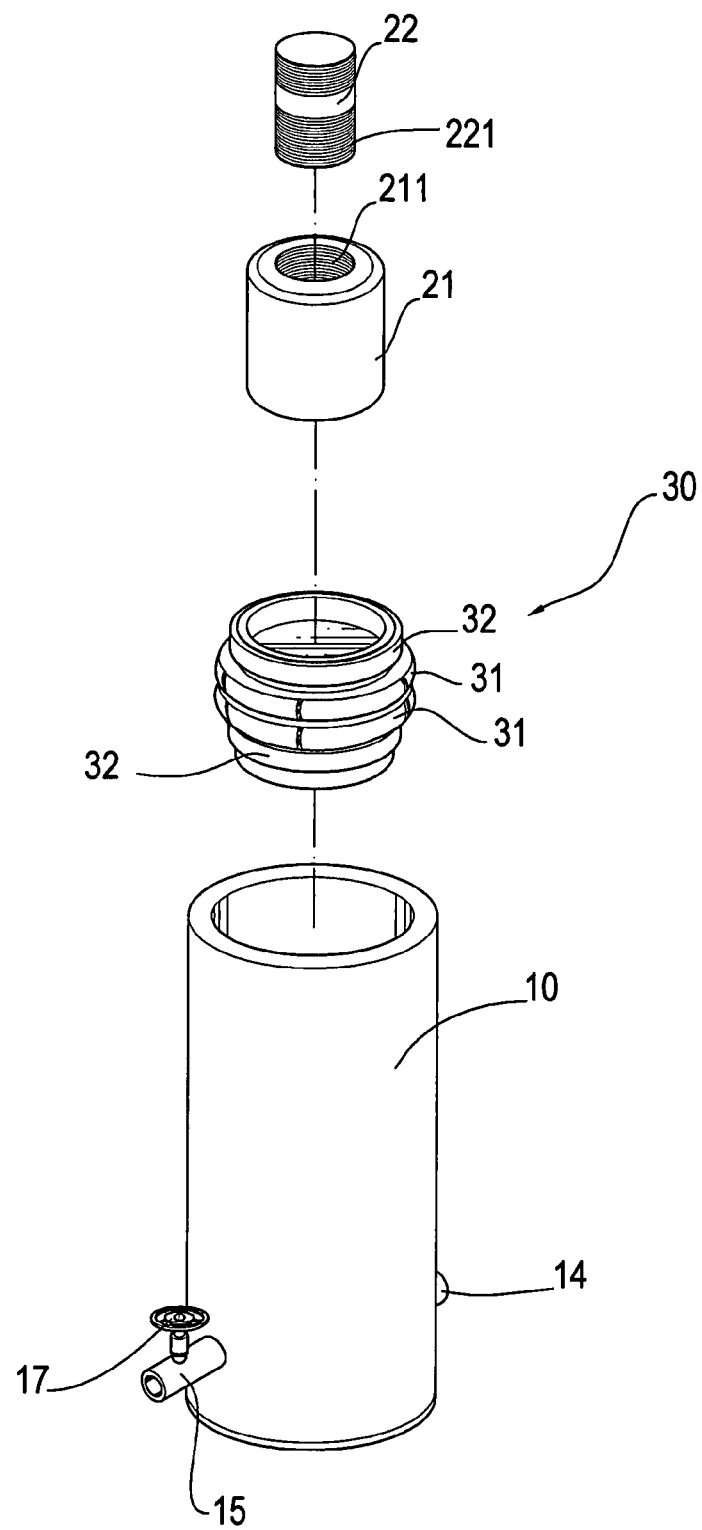
FIG. 5 is an exploded view of a gravity-controlled constant-pressure and pressure-regulation device constructed in accordance with a second embodiment of the present invention.

FIG. 5 shows a gravity-controlled constant-pressure and pressure-regulation device constructed in accordance with a second embodiment of the present invention, which comprises a canister 10 and a weight block 20. The canister 10 is provided with an air outlet 15 and an air inlet 14. The air outlet 15 is provided with a flow control switch 17 to control the flowrate of air released through the outlet 15. A seal head 30 is movably received in the canister 10. The seal head 30 is made of aluminum casting and is provided with sealing rings 31 to eliminate leakage of air. The seal head 30 is further provided with abrasion-resistant guide projections 32 on upper and lower sides of the sealing rings 31. The weight block 20 is mounted on the seal head 30. The canister 10 is stationary, while the weight block 20 and the seal head 30 are movable upward and downward inside the canister 10 with the increase/decrease of the amount of air inside the canister 10.

The weight block 20 comprises a coupling seat 21 and a coupler block 2. The coupling seat 21 is provided with a coupling portion 211, which in the embodiment illustrated comprises an inner threading, while the coupler block 22 is provided with a mated coupling portion 221, which in the embodiment illustrated comprises an external threading to allow the coupling seat 21 and the coupler block 22 to be releasably coupled together. In this way, the coupler block 22 can be modified to suit requirement for different gravitational forces by replacing one of different weight or by mounting an additional block to the coupler block 22. With such an arrangement, the weight block 20 and the seal head 30 is movable upward/downward inside the canister 10 by being acted upon by the their own weight (gravity) and a lifting force induced by the pressure of the air inside the canister 10 to thereby form a gravity-controlled constant-pressure and pressure-regulation device that discharges stable and constant air flow.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. A gravity-controlled constant-pressure and pressure-regulation device comprising a canister, a weight block, and a seal head, the canister comprising a metal layer, an epoxy resin layer, and a plastic sheet layer, the metal layer serving as an inner lining, the epoxy resin layer surrounding an outer circumference of the metal layer, the plastic sheet layer surrounding an outer circumference of the epoxy resin layer, the weight block being movably received in the canister, the canister forming an air inlet and an air outlet, the metal layer having an inner surface movably and receivingly engages the seal head and the weight block being mounted to the seal head, the seal head being provided with sealing rings to seal between the seal head and the inner surface of the metal layer to prevent air leakage, wherein the weight block is movable upward and downward inside the canister by being acted upon by a gravity force of weight thereof and a lifting force induced by pressure inside the canister to effect mass storage of air inside the canister and stable supply air at constant pressure.

2. The gravity-controlled constant-pressure and pressure-regulation device as claimed in claim 1, wherein the weight block comprises a metal block.

3. The gravity-controlled constant-pressure and pressure-regulation device as claimed in claim 1 further comprising support blocks mounted on a bottom of the canister and extending therefrom to a position higher than the air inlet and the air outlet.

4. The gravity-controlled constant-pressure and pressure-regulation device as claimed in claim 1, wherein the seal head comprises abrasion-resistant guide projection on upper and lower sides of the sealing rings.

5. The gravity-controlled constant-pressure and pressure-regulation device as claimed in claim 1, wherein the air outlet is provided with a flow control switch.

6. The gravity-controlled constant-pressure and pressure-regulation device as claimed in claim 1 further comprising reinforcing frame formed around the metal layer to retain shape of the metal layer.

7. The gravity-controlled constant-pressure and pressure-regulation device as claimed in claim 1, wherein the weight block comprises a coupling seat and a coupler block, the coupling seat having a coupling portion and the coupler block having a mated coupling portion for releasably coupling the coupling seat and the coupler block together.

8. The gravity-controlled constant-pressure and pressure-regulation device as claimed in claim 1, wherein the coupling portion of the coupling seat comprises inner threading and wherein the coupling portion of the coupler block comprises external threading.

* * * * *